United States Patent
Snapp et al.

(10) Patent No.: US 7,302,582 B2
(45) Date of Patent: Nov. 27, 2007

(54) DELIVERY POINT VALIDATION SYSTEM

(75) Inventors: Robert F. Snapp, Memphis, TN (US); James D. Wilson, Collierville, TN (US)

(73) Assignee: United States Postal Service, Washington, DC (US)

( * ) Notice: Subject to any disclaimer, the term of this patent is extended or adjusted under 35 U.S.C. 154(b) by 561 days.

(21) Appl. No.: 10/344,990

(22) PCT Filed: Aug. 21, 2001

(86) PCT No.: PCT/US01/26125

§ 371 (c)(1),
(2), (4) Date: Feb. 20, 2003

(87) PCT Pub. No.: WO02/17262

PCT Pub. Date: Feb. 28, 2002

(65) Prior Publication Data

US 2004/0128274 A1   Jul. 1, 2004

(51) Int. Cl.
G06F 7/00   (2006.01)

(52) U.S. Cl. ............... 713/185; 713/176; 713/182; 726/2; 707/200; 235/375; 705/50

(58) Field of Classification Search ............... 713/176, 713/182, 185; 726/2; 707/200; 235/375; 705/50

See application file for complete search history.

(56) References Cited

U.S. PATENT DOCUMENTS 4,871,903 A * 10/1989 Carrell .................. 235/375
5,204,966 A * 4/1993 Wittenberg et al. ............ 726/6
5,420,403 A * 5/1995 Allum et al. ............... 235/375

(Continued)

FOREIGN PATENT DOCUMENTS

WO   WO 2004/023711 A1   3/2004

OTHER PUBLICATIONS

Carter et al.; "Exact and Approximate Membership Testers"; ACM $10^{th}$ STOC, pp. 59-65, (1978).

(Continued)

*Primary Examiner*—Taghi Arani
(74) *Attorney, Agent, or Firm*—Finnegan, Henderson Farabow, Garrett & Dunner, L.L.P.

(57) ABSTRACT

Systems and methods consistent with the present invention encode a list so users of the list may make inquires to the coded list without the entire content of the list being revealed to the users. Each item in the list turns on one or more bits in the array 110. Once each item in the list has been encoded by an encoder, a bit array with high and low values is used to represent the items in the list. The bit array may be embodied in a validation system for allowing users to query the list to determine whether an inquiry item is on the list 105. The validation system determines which bits to check by executing the same coding process executed by the encoder. If all the bits are high, then the inquiry item is determined to be part of the list, if at least one of the bits is low, then the inquiry item is determined not to be part of the original list. An exemplary encoder and validation system comprises a standardizer, a hashing function unit, an extraction circuit, and an offset circuit.

50 Claims, 7 Drawing Sheets

U.S. PATENT DOCUMENTS

| | | | |
|---|---|---|---|
| 5,491,752 | A | 2/1996 | Kaufman et al. |
| 5,742,807 | A | 4/1998 | Masinter |
| 5,819,291 | A * | 10/1998 | Haimowitz et al. ......... 707/201 |
| 5,903,651 | A * | 5/1999 | Kocher ...................... 713/158 |
| 5,933,604 | A | 8/1999 | Inakoshi |
| 5,966,542 | A | 10/1999 | Tock |
| 6,006,200 | A | 12/1999 | Boies et al. |
| 6,289,334 | B1 | 9/2001 | Reiner et al. |
| 6,308,247 | B1 | 10/2001 | Ackerman et al. |
| 6,347,376 | B1 | 2/2002 | Attwood et al. |
| 6,457,012 | B1 | 9/2002 | Jatkowski |
| 6,516,320 | B1 | 2/2003 | Odom et al. |
| 6,754,785 | B2 | 6/2004 | Chow et al. |
| 6,763,344 | B1 | 7/2004 | Osentoski et al. |
| 2001/0044783 | A1 | 11/2001 | Weisberg et al. |
| 2002/0049670 | A1 | 4/2002 | Moritsu et al. |
| 2003/0028783 | A1 | 2/2003 | Collins et al. |
| 2003/0177021 | A1 | 9/2003 | Dutta |
| 2004/0065598 | A1 | 4/2004 | Ross et al. |
| 2004/0111443 | A1 | 6/2004 | Wong et al. |
| 2004/0181670 | A1 * | 9/2004 | Thune et al. ............... 713/176 |
| 2004/0210763 | A1 | 10/2004 | Jonas |
| 2005/0060556 | A1 | 3/2005 | Jonas |
| 2005/0066182 | A1 | 3/2005 | Jonas et al. |

OTHER PUBLICATIONS

Bellare et al.; "Collision-Resistant Hashing: Towards Making UOWHFs Practical"; Advances In Cryptology—CRYPTO '97, Santa Barbara, Aug. 17-21, 1997; Proceedings of the Annual International Cryptology Conference (CRYPTO), Berlin, Springer, Germany; vol. Conf. 17, pp. 470-484, (1997).

Carter et al., "Exact and Approximate Membership Testers," ACM 10th STOC, pp. 59-65, (1978).

Bellare et al., "Collision-Resistant Hashing: Towards Making UOWHFs Practical," Advances in Cryptology Conference (CRYPTO); Germany; vol. Conf. 17, pp. 470-484, (1997).

International Search Report for PCT/US01/26125, 3 pages mailed Mar. 26, 2002.

"IBM DB2 Anonymous Resolution Version 3.8 Technical Information," Publication of IBM Corporation, USA, May 2005 (2 pages).

Friedrich, Andrew, "IBM DB2 Anonymous Resolution: Knowledge Discovery Without Knowledge Disclosure," Whitepaper of IBM Corporation, USA, May 2005 (23 pages).

"DB2 Anonymous Resolution for Public Safety, Corrections, & Criminal Intelligence," Publication of IBM Corporation, USA, Feb. 2005 (2 pages).

"DB2 Anonymous Resolution," Publication of IBM Corporation, USA, May 2005 (2 pages).

Lohr, Steve, "I.B.M. Software Aims to Provide Security Without Sacrificing Privacy," The New York Times, May 24, 2005 (2 pages).

"Application of DB2 Anonymous Resolution to the Financial Services Industry," Whitepaper of IBM Corporation, USA, May 2005 (17 pages).

PCT International Preliminary Examination Report, mailed Nov. 12, 2003, for International Application No. PCT/US03/06672 (4 pages).

PCT International Search Report, mailed (Oct. 17, 2003) and Written Opinion mailed (Aug. 2, 2004) for International Application No. PCT/US03/18412 (12 pages).

PCT International Search Report (mailed Mar. 26, 2002), Written Opinion (mailed Feb. 13, 2003) and International Preliminary Examination Report (completed May 6, 2003) for International Application No. PCT/US01/26125 (12 pages).

PCT International Search Report mailed May 23, 2003, for International Application No. PCT/US03/06672 (5 pages).

* cited by examiner

DELIVERY POINT VALIDATION SYSTEM

DESCRIPTION OF THE INVENTION

1. Field of the Invention

The present invention relates to a system and method for validating or confirming information.

2. Background of the Invention

Many occasions arise when validation or confirmation of information is desired before taking a particular action. For example, a person may want to confirm that an address is a valid address before sending a valuable item or sensitive information to the address. As another example, a delivery business may want to confirm an address before sending a product. There are also occasions when validating an address can be lifesaving. For example, fire departments, ambulance companies, and police departments may want to confirm an address to efficiently respond to an emergency. There are times when other types of information, besides addresses, need to be validated or confirmed. For example, a traffic officer may need to confirm that a driver's license is valid before permitting a person to drive.

Despite the need to validate or confirm information, in today's information technology age, businesses and individuals are concerned about privacy and information security. Furthermore, businesses consider information to be a valuable company asset. Because of the concerns about information security and the view that information is an asset, owners of information may want to keep their information private and secure. On the other hand, an owner of information may also want to exploit the information by providing the information to others. For example, an owner of information comprising a list of all persons with access to a building may want to provide the list to a security company so that the security company may confirm whether a person seeking entrance into the building is on the list. However, for privacy reasons, the owner may not want to reveal to the security company all persons on the list. That is, the owner may feel that the list should only be revealed one person at a time as a person seeks entrance to the building. If a person on the list never seeks entrance to the building, then the security company never needs to know that the person is on the list. Based on the above concerns, it would be advantageous if an owner of information could provide the information to others for inquiry purposes, the information being in an encrypted format so that information may remain confidential.

SUMMARY OF THE INVENTION

In accordance with the invention, there is provided a method for representing a list of items using a bit array wherein each bit in the bit array is initialized to a first value. The method comprises converting each item into a N-bit object and determining bit positions based on the N-bit object. The method further comprises setting bits of the bit array to a second value at the determined bit positions.

There is further provided a method for determining whether an inquiry item is on a list of items. The list of items is represented by a bit array having first and second values. The method comprises converting the inquiry item into a N-bit object in a same manner that an item on a list of items is converted to produce a bit array representing the list of items. The method further comprises determining bit positions based on the N-bit object in a same manner that bit positions are determined for producing the bit array. Still further, the method comprises determining that the inquiry item is on the list if the bits of the bit array equal a second value at the determined bit positions and determining that the inquiry item is not on the list if at least one bit of the bit array does not equal a second value at the predetermined bit positions.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 1:
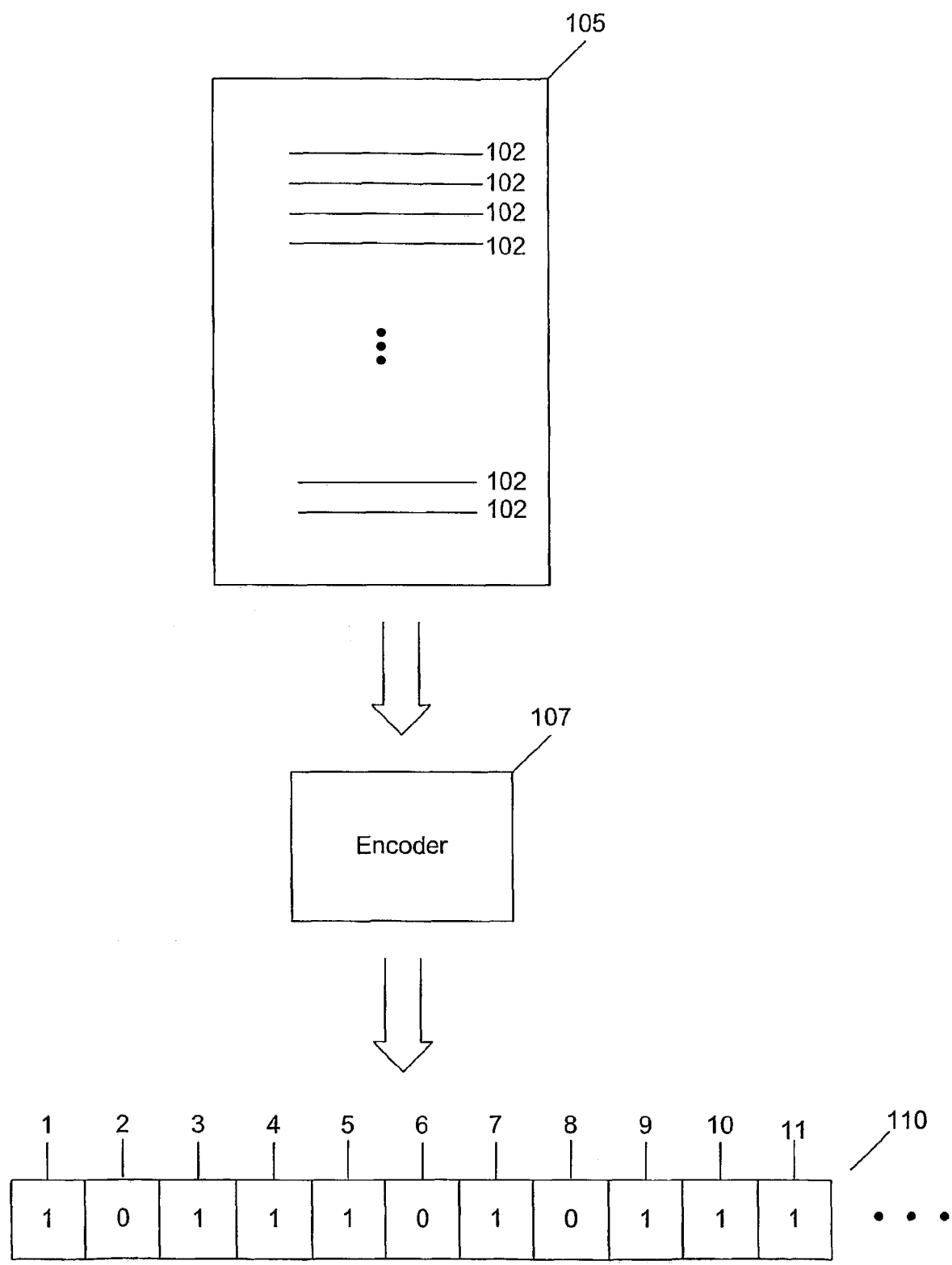
FIG. 1 illustrates a process of converting a list of items into a bit array consistent with an embodiment of the present invention.

Systems and methods consistent with the present invention encode a list so that users of the list may make inquires to the coded list without the entire content of the list being revealed to the users. FIG. 1 illustrates an example of a coded list 110 that may be derived from a list 105 based on an encoder 107 in accordance with the present invention. The list 105 may comprise addresses, names, license numbers, or any other type of information. In this example, the coded list 110 is an array of bits (i.e., 1, 2, 3, etc.) The size of the bit array 110 may be chosen to reduce the number of false positives that may result when a user makes an inquiry to the list 105, as discussed in greater detail below.

Each item 102 in the list 105 turns on one or more bits in the bit array 110. That is, initially all the bits in the bit array 110 are low and are changed to high based on an item 102 in the list 105. More specifically, each item 102 in the list 105, once encoded by encoder 107, indicates which bit or bits to turn on in the bit array 110 to represent the item 102. For example, the first item 102 in the list 105 may turn on bits 1, 3, 11, as shown in FIG. 1. The second item 102 in the list 105 may turn on bits 5, 7, and 10, and so on. Multiple items 102 in the list 105 may turn on the same bit. For example, a first, fourth, and tenth item 102 in the list 105 may turn on bit 11. Practically speaking, once a bit is turned on by an item 102, it remains on and is unaffected if other items 102 indicate that it should be turned on.

Each item 102 may turn on one or multiple bits in the bit array 110. In the example above, each item 102 turns on three (3) bits. However, a greater or lesser number of bits may be turned on for each item 102. The number of bits to turn on may be chosen to reduce the number of false positives that may result when a user makes an inquiry to the list 105, as discussed in greater detail below.

Once the encoder 107 has encoded each item 102 in the list 105, a bit array 110 with high and low values is used to represent the items 102 in the list 105. The bit array 110 may then be used by third parties for inquiry purposes without the content of the list 105 being revealed. Referring to FIG. 2, the bit array 110 may be embodied in a validation system 207 for allowing users to query the list 105 to determine whether an inquiry item 202 is on the list 105. For example, assume that the bit array 110 represents a list of all person with access to a building. Users of the bit array 110 may query the list 105 to determine whether a name is on the list 105 by inputting the name, i.e., the inquiry item 202, into the validation system 207. The validation system 207 may return a "yes" response, indicating that the name is on the list, or may return a "no" response, indicating the name is not on the list.

Figure 2A:
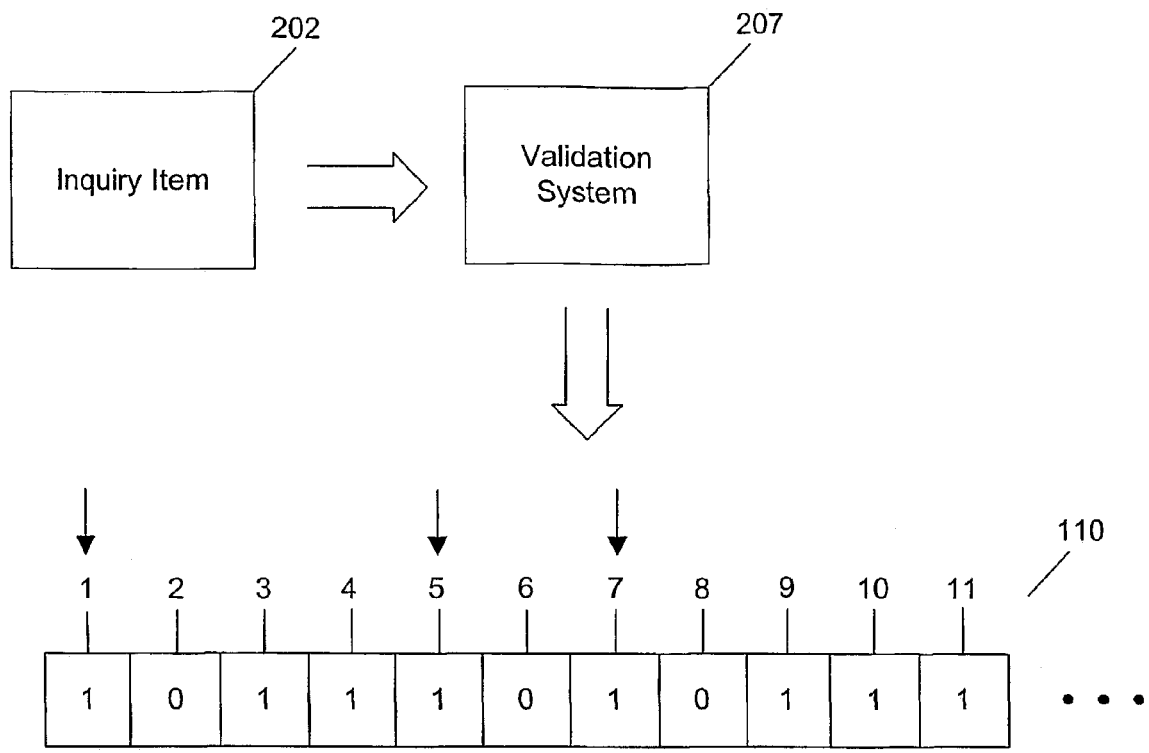
FIG. 2 illustrates a process of determining whether an inquiry item is on a list represented by a bit array consistent with an embodiment of the present invention.
Figure 2B:
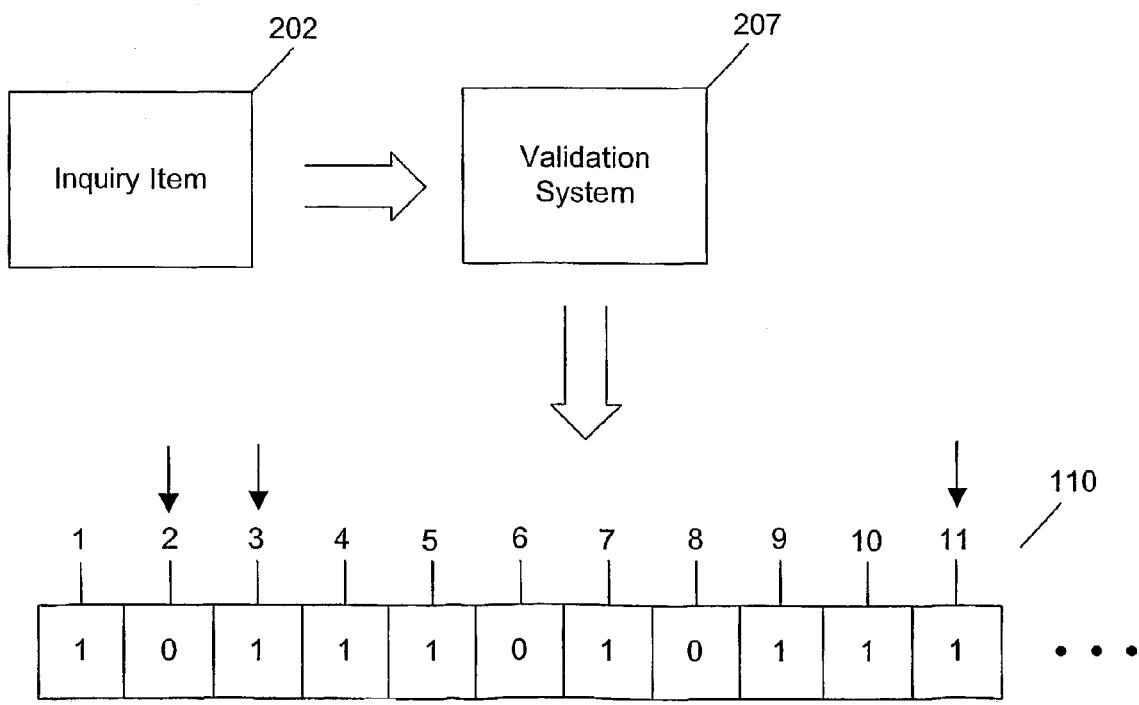

The inquiry item 202 undergoes the same encoding process that an original list item 102 undergoes. That is, the validation system 207 executes the same encoding process executed by the encoder 107. Recall that for the original list items 102, the encoder 107 determines which bits of the bit array 110 to turn on. For an inquiry item 202, the validation system 207 determines which bits of the bit array 110 to check. If all the bits checked are high, then the inquiry item 202 is determined to be part of the list. If at least one of the bits checked is low, then the inquiry item 202 is determined not to be part of the original list 105. For example, assume that that the validation system 207 processes the inquiry item 202, determining which bits to check. In FIG. 2A, the validation system 207 checks bits 1, 5, and 7. Because bits 1, 5, and 7 are all high, the validation system 207 determines that the inquiry item 202 is on the original list 105 and returns an affirmative. As another example, in FIG. 2B, the validation system 207 checks bits 2, 3, and 11. Because bit 2 is low, the validation system 207 determines that the inquiry item 202 is not on the original list 105 and returns a negative response. In this way, an owner of a list may provide a coded list to third parties to determine whether an item is on a list, without revealing the content of the list.

Figure 7:
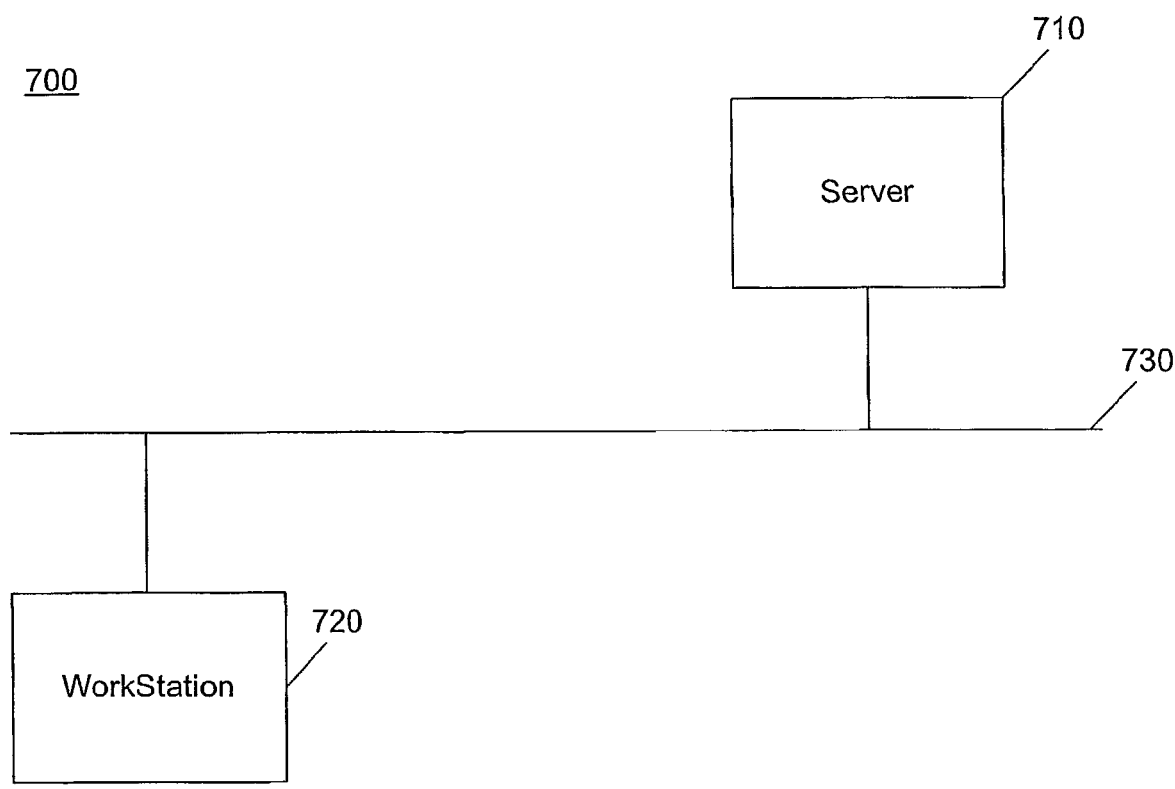
FIG. 7 illustrates an exemplary system network that may be used to practice the invention.

FIG. 7 illustrates an exemplary system network 700 in which to practice the present invention. The network 700 consists of a server 710, a workstation 720, and a communication link 730. The server 710 may store the bit array 110 and validation system 207 used to determine whether an inquiry item 202 is on a list 105. The workstation 720 may be a personal computer having a keyboard for inputting an inquiry item 202. The communication link 730 transmits the inquiry item 202 to the server 710 wherein the validation system 207 processes the inquiry item 202 and returns an affirmative or negative response via the communication link 730 to the workstation 720. The network 700 may be a local area network (LAN) or a wide area network (WAN) to include the Internet, for example. The network 700 may be wireless. In an alternate embodiment, a stand-alone workstation may store the bit array 110 and validation system 207 and a user may input an inquiry item 202 via the workstation's keyboard or other input device to determine locally whether the inquiry item 202 is on a list 105.

Figure 3:
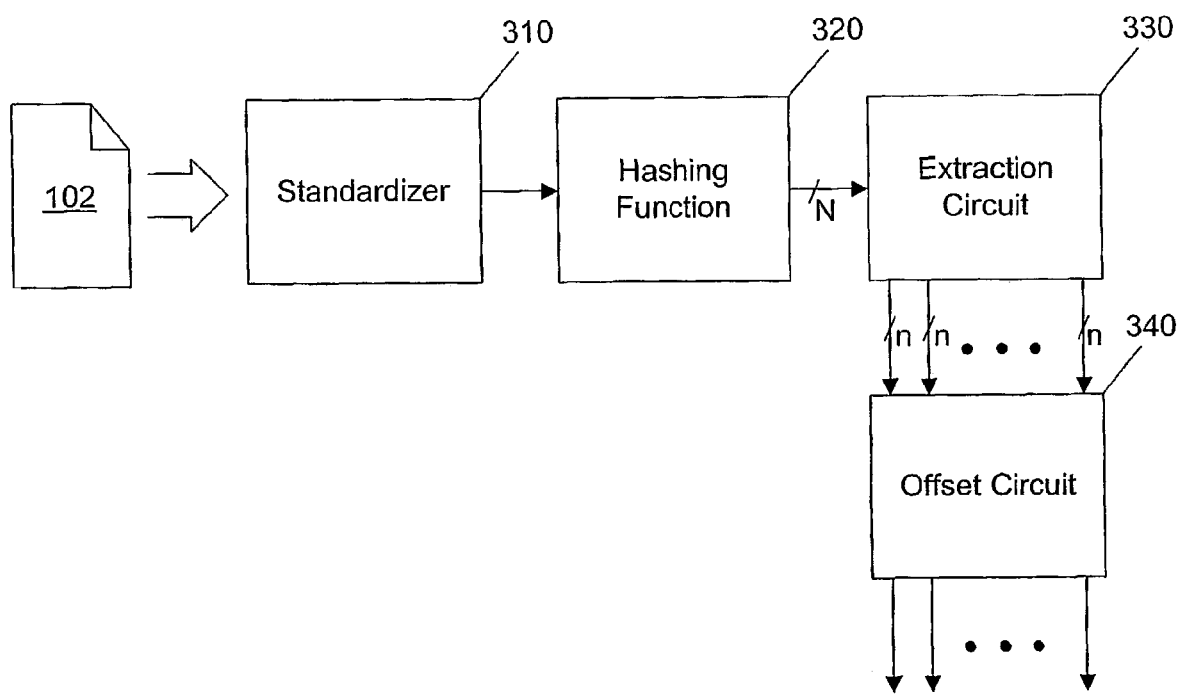
FIG. 3 illustrates an encoder for encoding a list of items into a bit array consistent with an embodiment of the present invention.

FIG. 3 illustrates an exemplary encoder 107 for encoding a list 105, resulting in an array of bits 110, as described above. The encoder 107 comprises a standardizer 310, a hashing function unit 320, an extraction circuit 330, and an offset circuit 340.

The standardizer 310 converts an input into a standard format prior to encoding. This step may be desirable for a list that may contain multiple variations of the same information. For example, a list that contains addresses may have multiple entries of the same address in different formats. It may be more efficient to encode a single representation of the same item than to encode each variation of the item. For instance, assume that multiple variations for an address are provided on a list. The entries include: 123 Main Street, Apartment 456; 123 Main St., Apt. 456; and 123 Main St., # 456. The standardizer 310 may convert each of these entries to 123 Main St. 456 and encode this representation of the address rather than encoding each variation of the address.

Figure 6:
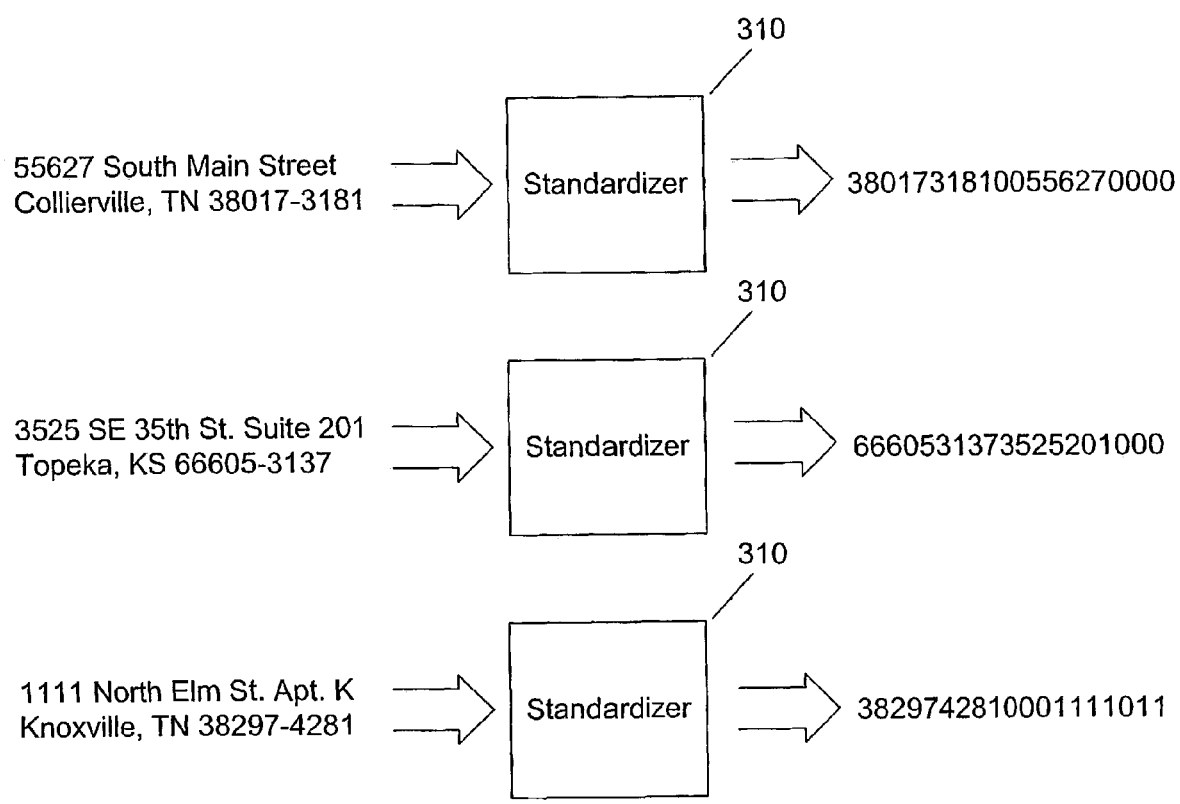
FIG. 6 illustrates an exemplary method of standardizing an address consistent with an embodiment of the present invention.

The standardizer 310 may standardize a list in accordance with the teachings disclosed in the Provisional Application No. 60/277,622 entitled, "A Method For Standardizing A Mailing Address, Enhanced Modified Delivery Point", by Robert Snapp, filed on Mar. 22, 2001, which is incorporated by reference. The provisional application discloses a method for standardizing a mailing address into a numeric string. As shown in FIG. 6, a mailing address may be standardized by concatenating the nine-digit zip code of the address; a seven digit segment comprising the address number (i.e., the primary number) preceding the address name and the address number (i.e., the secondary number) following the address name (e.g., the suite or apartment number); and a three digit segment comprising a numeric representation of up to two alphanumeric characters which may appear in the primary or secondary number (e.g., Apt. K). The seven-digit segment may be padded with leading zeros if the total number of digits in the primary number and secondary number is less than seven digits. For the three digit segment, the numeric representation of a single alphanumeric character in the primary or secondary number may be as follows: space=0, A=1, B=2, ..., Z=26. The numeric representation of two alphanumeric characters in the primary or secondary number may be determined by multiplying the numeric value of the first alphanumeric character by 27 and then adding the value of the second alphanumeric character (e.g., AA=1×27+1; ZZ=26×27+26). It will be understood by those of ordinary skill in the art that a different standardization technique may be used to standardize a list of items.

Once a list item 102 is standardized, it is input to the hashing function unit 320. The hashing function unit 320 may execute a one-way hash function, i.e., a function that transforms an input item making it difficult to impossible to reproduce the input. For example, a one-way hash function may take an input and produce an N-bit object having no obvious relationship to the input. Furthermore, a hash function may produce significantly different outputs for similar, but not identical, inputs. In an exemplary embodiment, the hashing function unit 320 executes a secure hashing algorithm, SHA-1, which was developed by the National Institute of Standards and Technology (NIST) and is an ANSI standard encryption technique.

The SHA-1 transforms an input into a 160-bit (20 byte) object called a message digest. The SHA-1 sequentially processes blocks of 512 bits when computing the message digest. Therefore, the SHA-1 pads an input bit string to produce a bit string with a length that is a multiple, n, of 512 prior to processing the input bit string. The SHA-1 pads the input bit string by appending a "1" to the input bit string, followed by a number of "0"s depending on the original length of the input bit string, followed by a 64-bit integer representing the original length of the input bit string. The number of "0"s appended to the input bit string equals a number which will produce a bit string with a length that is a multiple of 512 once the "1", the "0"s, and the 64-bit integer is added to the input bit string. For example, to pad an input bit string with a length of 40, a "1" is appended to the input bit string, followed by 407 "0"s, followed by a 64-bit integer representing the length of the input bit string (i.e., 40).

The padded input bit string is viewed as a sequence of n blocks $M_1, M_2, \ldots, M_n$, where $M_i$ contains 16 words. Constant words $K_0, K_1, \ldots, K_{79}$ are used in the SHA-1, where, in hex:

$$K_t = 5A827999 \ (0 \leq t \leq 19)$$

$$K_t = 6ED9EBA1 \ (20 \leq t \leq 39)$$

$$K_t = 8F1BBCDC \ (40 \leq t \leq 59)$$

$$K_t = CA52C1D6 \ (60 \leq t \leq 79)$$

To generate the 160-bit message digest, the SHA-1 processes the blocks, $M_i$, for $i=1, \ldots, n$. For each block, $M_i$, the SHA-1 computes constants words $H_0, H_1, H_2, H_3,$ and $H_4$. Initially, for block $M_1$, $H_0=67452301$, $H_1=EFCDAB89$, $H_2=98BADCFE$, $H_3=10325476$, and $H_4=C3D2E1F0$ (all in hex). $H_j$ for $j=0, 1, 2, 3, 4$ for subsequent blocks, $M_i$, initially equals the $H_j$ computed for the previous block. The $H_0, H_1, H_2, H_3,$ and $H_4$ computed for block $M_n$ is the 160-bit message digest.

Each block, $M_i$, is processed in the following manner. First, block $M_i$ is divided into 16 words, $W_0, W_1, \ldots, W_{15}$. In addition, the following variables are initialized: $A=H_0$, $B=H_1$, $C=H_2$, $D=H_3$, and $E=H_4$. For $t=0$ to 79, the SHA-1 computes the following equations:

$$TEMP = S^5(A) + f_t(B,C,D) + E + W_t + K_t$$

$$E=D; \ D=C; \ C=S^{30}(B); \ B=A; \ A=TEMP$$

where:

$S^n(X)$ is a circular shift of X by n positions to the left $$f_t(B,C,D) = (B \wedge C) \vee (\sim B \wedge D) \ (0 \leq t \leq 19)$$

$$f_t(B,C,D) = B \ XOR \ C \ XOR \ D \ (20 \leq t \leq 39)$$

$$f_t(B,C,D) = (B \wedge C) \vee (B \wedge D) \vee (C \wedge D) \ (40 \leq t \leq 59)$$

$$f_t(B,C,D) = B \ XOR \ C \ XOR \ D \ (60 \leq t \leq 79)$$

$$W_t = S^1(W_{t-3} \ XOR \ W_{t-8} \ XOR \ W_{t-14} \ XOR \ W_{t-16})$$
$$(16 \leq t \leq 79)$$

$X \wedge Y$=bitwise logical "and" of X and Y
$X \vee Y$=bitwise logical "inclusive-or" of X and Y
$X \ XOR \ Y$=bitwise logical "exclusive-or" of X and Y
$\sim X$=bitwise logical "complement" of X
$X+Y = (x+y) \bmod 2^{32}$ converted to a word, where x is the integer of X and y is the integer of Y.

After the above equations have been computed, $H_j$ is computed as follows:

$$H_0 = H_0 + A$$

$$H_1 = H_1 + B$$

$$H_2 = H_2 + C$$

$$H_3 = H_3 + D$$

$$H_4 = H_4 + E$$

As stated above, the $H_0$, $H_1$, $H_2$, $H_3$, and $H_4$ computed for block $M_n$ is the 160-bit message digest.

Figure 4:
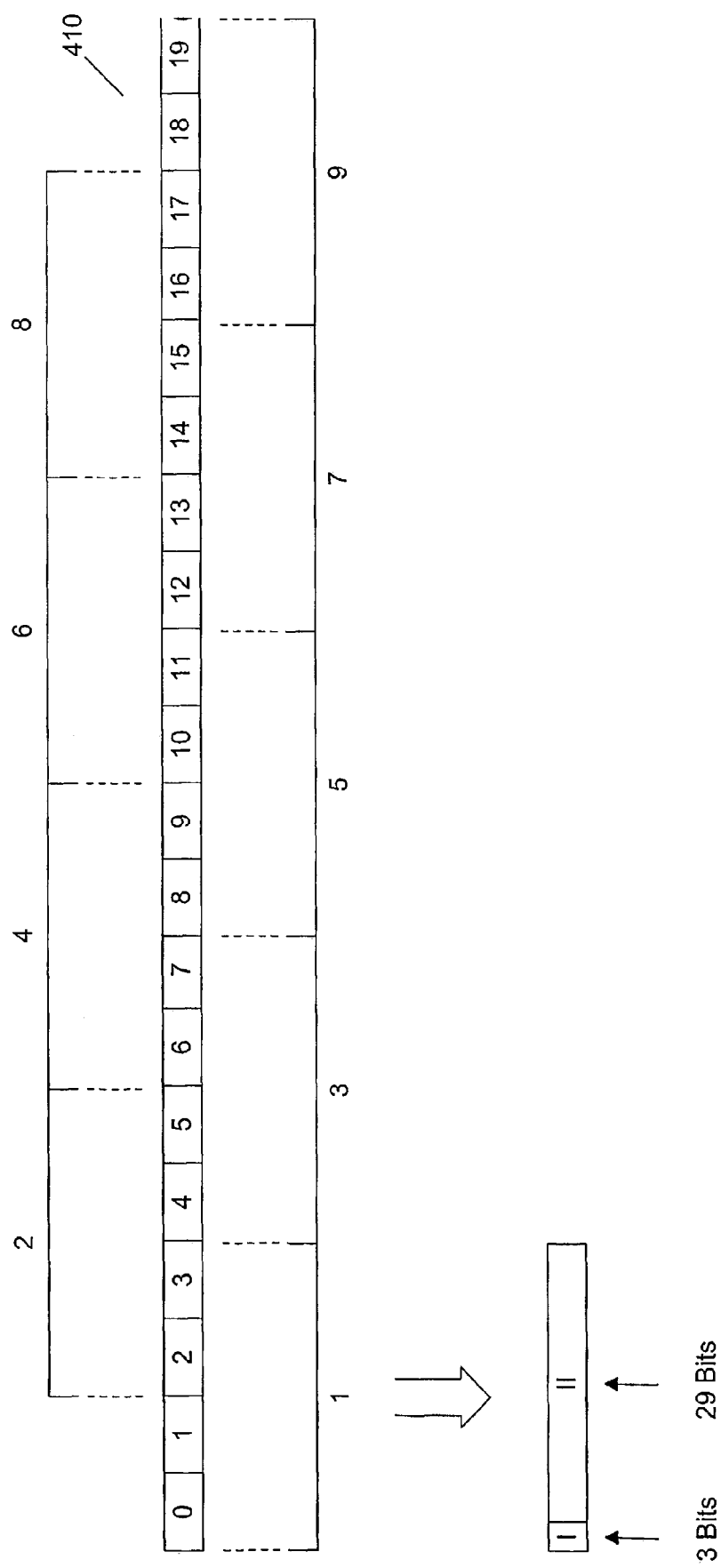
FIG. 4 illustrates an exemplary method of extracting bit samples consistent with an embodiment of the present invention.

The extraction circuit 330 extracts multiple n-bit samples from the N-bit object input from the hashing function unit 320. If the size of the bit array 110 is equal to $2^x$ bits, then the size of each sample extracted from the N-bit object should be equal to or greater than x bits. The number of samples to extract from the N-bit sample may correspond to the number of bits that are turned on during the encoding process for each list item 102. In the case of the SHA-1, for example, the extraction circuit 330 may extract nine (9) 32-bit samples from the 160-bit object input from the hashing function unit 320. FIG. 4 illustrates an example of how an extraction circuit 330 may extract multiple 32-bit samples 1 through 9 from a 160-bit object 410. Each number block (i.e., 0, 1, 2, etc.) represents a byte. The multiple n-bit samples extracted by the extraction circuit 330 are input to the offset circuit 340. It will be understood by a person of ordinary skill in the art that a different extraction technique may be employed.

The offset circuit 340 determines which bits in the bit array 110 to turn on based on the n-bit samples from the extraction circuit 330. Each n-bit sample turns on a bit in the bit array 110. Therefore, in FIG. 4, a total of 9 bits in the bit array 110 will be turned on based on the bit samples 1 through 9, respectively. FIG. 4 illustrates how a 32-bit sample for the 160-bit object 410 may be used to determine which bit in a bit array 110 to turn on. As shown in FIG. 4, a 32-bit sample is divided into 2 objects. The first object comprises the leftmost three bits in the 32-bit sample. The second object comprises the remaining 29 bits in the 32-bit sample. The second object determines which byte in the bit array 110 contains the bit to be turned on. The first object determines which bit in the byte to turn on. For example, a second object may determine that the first byte of a bit array 110 contains the bit to be turned on. The first object may determine that the third bit of the first byte of the bit array 110 is to be turned on, as illustrated in FIG. 1. It will be understood by a person of ordinary skill in the art that a different technique may be employed to determine which bits to turn on in the bit array 110.

The encoder 107 may be implemented in software, firmware, hardware, or any combination thereof. The bit array 110 may be stored in any semi-permanent or permanent holding place for digital data, such as a magnetic disk (e.g., floppy disk or hard disk), optical disk (e.g., CD, CD-ROM, DVD-ROM), or magnetic tape.

As discussed above, the size of the bit array 110 or the number of bits the encoder 107 turns on may be chosen to reduce the number of false positives that may result when a user makes an inquiry to the list 105. False positives result when the validation system 207 returns an affirmative response although an inquiry item 202 is not on the list 105. This occurs because all the bits checked by the validation system 207 for the inquiry item 202 coincidentally where turned on by one or more other list items 102 during the encoding process. The probability of a false positive equals $$\left(\frac{S}{M}\right)^k,$$

where M equals the number of bits in the bit array 110, S equals the total number of bits turned on in the bit array 110, and k equals the number of bits the encoder 107 turns on per list item 102. Furthermore, S, the total number of bits turned on in the bit array 110, is approximately equal to $$M\left(1 - e^{\frac{Nk}{M}}\right),$$

where N equals the number of list items 102. M, the number of bits in the bit array 110, and k, the number of bits turned on per list item 102, may be chosen to minimize the number of false positives based on the above equations. However, a higher false positive rate above the minimum may be chosen based on other considerations such as processing speed.

Figure 5:
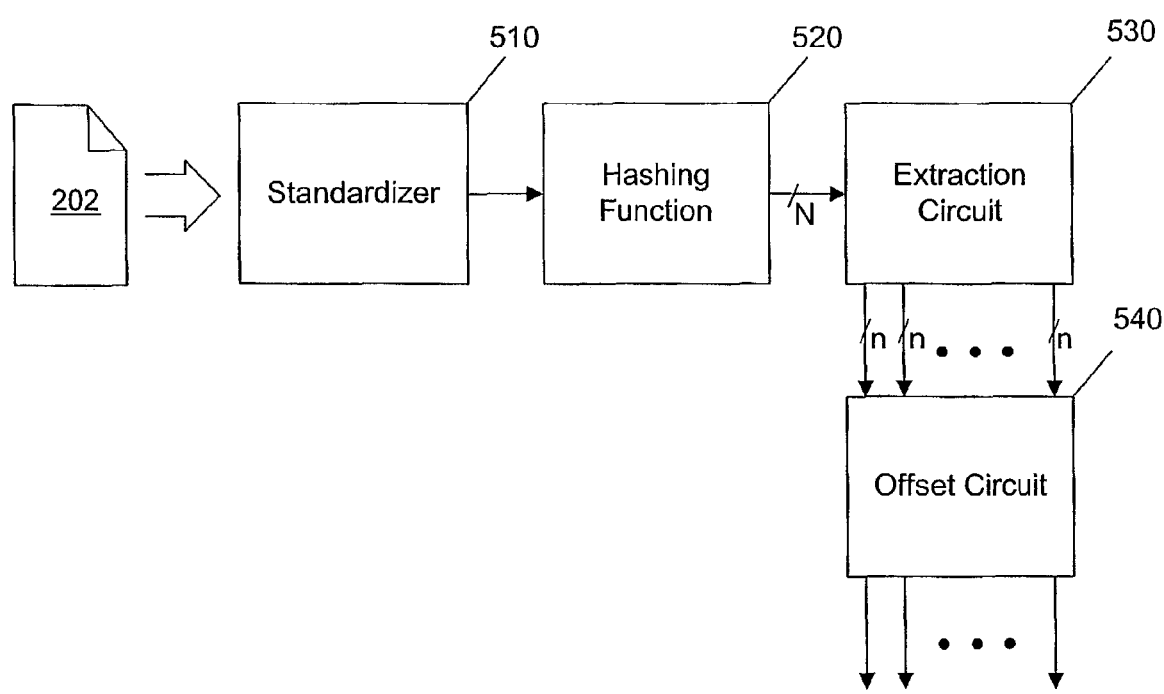
FIG. 5 illustrates a validation system for determining whether an inquiry item is on a list consistent with an embodiment of the present invention.

FIG. 5 illustrates an exemplary validation system 207 for validating an inquiry item 202. As discussed above, the validation system 207 utilizes the same encoding process as used by the encoder 107. Therefore, the validation system 207 of FIG. 5 is similar to the encoder 107 of FIG. 3. The validation system 207 comprises a standardizer 510, a hashing function unit 520, an extraction circuit 530, and an offset circuit 540.

When an inquiry is made to determine whether an inquiry item 202 is on a list, it may be desirable to standardize the inquiry item 202 prior to determining whether the inquiry item 202 is on the list. If an inquiry item 202 is not standardized, the validation system 207 may incorrectly determine that the inquiry item 202 is not on the list simply because it is in a different format. The standardizer 510 may eliminate this problem by converting the inquiry item 202 into a standard format prior to validating. The standardizer 510 may operate in a same manner as the standardizer 310. Once an inquiry item 202 is standardized, it is input to the hashing function unit 520.

The hashing function unit 520 executes the same one-way hash function that is executed by the hashing function unit 320, generating an N-bit object. The N-bit object is input to the extraction circuit 530.

The extraction circuit 530 extracts multiple n-bit samples from the N-bit object in the same manner that the extraction circuit 330 extracts multiple n-bit samples. The multiple n-bit samples extracted by the extraction circuit 530 are input to the offset circuit 540.

The offset circuit 540 determines which bits in the bit array 110 to test based on the n-bit samples from the extraction circuit 530. The offset circuit 540 makes this determination in the same manner that the offset circuit 340 determines which bits in the bit array 110 to turn on. The validation system 207 tests the bits indicated by the offset circuit 540. As discussed above, if the bits tested are all high, then the validation system 207 determines that the inquiry item 202 is on the list 105; if at least one of the bits is low, then the validation system 207 determines that the inquiry item 202 is not on the list 105.

The validation system 207 may be implemented in software embodied locally in a workstation or in a server as shown in FIG. 7. Alternatively, the validation system 207 may be implemented in firmware, hardware, or any combination of software, firmware, and hardware.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for representing a list comprising addresses using a bit array wherein each bit in the bit array is initialized to a first value, comprising:
   extracting portions of each address on the list;
   combining the portions to create a standardized item that is smaller than the address;
   converting each standardized item to a N-bit object;
   determining bit positions based on the N-bit object;
   setting bits of the bit array to a second value at the determined bit and storing the bit array for use in determining whether an inquiry item is on the list.

2. The method according to claim 1, wherein an address on the list comprises a zip code, a primary address number, and a secondary address number and
   combining comprises concatenating the zip code, the primary address number, and the secondary address number.

3. The method according to claim 1, wherein converting comprises computing a hash function for each standardized item.

4. The method according to claim 3, wherein the hash function is the secure hashing algorithm, SHA-1.

5. The method according to claim 1, wherein determining comprises:
   extracting multiple n-bit samples from the N-bit object;
   dividing each n-bit sample into a plurality of fields; and
   determining, for each n-bit sample, a bit position based on the n-bit sample by using a first field of the plurality of fields to specify an address of a byte and using a second field of the plurality of fields to specify the bit position within the byte.

6. The method according to claim 1, further comprising:
   adding additional information not found in the address to at least one of the portions, wherein the additional information corresponds to information from the address.

7. The method according to claim 6, wherein the additional information is a ZIP+4 code, and the information from the address is one of a group comprising: a ZIP code and city identification information.

8. The method according to claim 1, wherein extracting portions of each address on the list comprises:
   extracting the portions that identify an address.

9. A method for determining whether an inquiry item is on a list comprising addresses, wherein the list comprising addresses is represented by a bit array having first and second values, the method comprising:
   extracting portions of the inquiry item in the same manner applied to items on the list comprising addresses;
   combining the portions to create a standardized inquiry item in the same manner applied to items on the list comprising addresses;
   converting the standardized inquiry item into a N-bit object in a same manner that an item on the list comprising addresses is converted to produce the bit array representing the list comprising addresses;

determining bit positions based on the N-bit object in a same manner that bit positions are determined for producing the bit array;

determining that the inquiry item is on the list if the bits of the bit array equal a second value at the determined bit positions and determining that the inquiry item is not on the list if at least one bit of the bit array does not equal a second value at the determined bit positions; and outputting a result indicating whether the inquiry item is or is not on the list comprising addresses.

10. The method according to claim 9, wherein the inquiry item comprises an address having a zip code, a primary address number, and a second address number and combining comprises concatenating the zip code, the primary address number, and the secondary address number.

11. The method according to claim 9, wherein converting comprises computing a hash function for the standardized inquiry item.

12. The method according to claim 11, wherein the hash function is the secure hashing algorithm, SHA-1.

13. The method according to claim 9, wherein determining bit positions comprises:

extracting multiple n-bit samples from the N-bit object;
dividing each n-bit sample into a plurality of fields; and
determining, for each n-bit sample, a bit position based on the n-bit sample by using a first field of the plurality of fields to specify an address of a byte and using a second field of the plurality of fields to specify the bit position within the byte.

14. The method according to claim 9, further comprising:
adding additional information not found in the inquiry item to at least one of the portions in the same manner applied to items on the list comprising addresses, wherein the additional information corresponds to information from the inquiry item.

15. The method according to claim 14, wherein the additional information is a ZIP+4 code, and the information from the inquiry item is one of a group comprising: a ZIP code and city identification information.

16. The method according to claim 9, wherein extracting portions of the inquiry item comprises:
extracting the portions that identify an address.

17. The method according to claim 16, wherein the inquiry item includes a delivery address specifying a destination to which to deliver an item, and
further comprising:
accepting the inquiry item from a user; and
providing, to the user, the result indicating whether the inquiry item is or is not on the list comprising addresses.

18. The method according to claim 16, wherein the inquiry item includes a building address specifying a location to which to send service personnel, and
further comprising:
accepting the inquiry item from a service personnel coordinator; and
providing, to the service personnel coordinator, the result indicating whether the inquiry item is or is not on the list comprising addresses.

19. A computer for representing a list comprising addresses using a bit array wherein each bit in the bit array is initialized to a first value, the computer comprising:
a memory having program instructions; and
a processor, responsive to the programming instructions, configured to:

extract portions of each address on the list;
combine the portions to create a standardized item that is smaller than the address;
convert each standardized item to a N-bit object;
determine bit positions based on the N-bit object;
set bits of the bit array to a second value at the determined bit positions; and
store the bit array for use in determining whether an inquiry item is on the list.

20. The computer according to claim 19, wherein an address on the list comprises a zip code, a primary address number, and a secondary address number and
combining comprises concatenating the zip code, the primary address number, and the secondary address number.

21. The computer according to claim 19, wherein converting comprises computing a hash function for each standardized item.

22. The computer according to claim 21, wherein the hash function is the secure hashing algorithm, SHA-1.

23. The computer according to claim 19, wherein determining comprises:
extracting multiple n-bit samples from the N-bit object;
dividing each n-bit sample into a plurality of fields; and
determining, for each n-bit sample, a bit position based on the n-bit sample by using a first field of the plurality of fields to specify an address of a byte and using a second field of the plurality of fields to specify the bit position within the byte.

24. The computer according to claim 19, wherein the processor is further configured to:
add additional information not found in the address to at least one of the portions, wherein the additional information corresponds to information from the address.

25. The computer according to claim 24, wherein the additional information is a ZIP+4 code, and the information from the address is one of a group comprising: a ZIP code and city identification information.

26. The computer according to claim 19, wherein the processor is further configured to:
extract the portions that identify a delivery location.

27. A computer for determining whether an inquiry item is on a list comprising addresses, wherein the list is represented by a bit array having first and second values, the computer comprising:
a memory having program instructions; and
a processor, responsive to the programming instructions, configured to:
extract portions of the inquiry item in the same manner applied to items on the list comprising addresses;
combine the portions to create a standardized inquiry item in the same manner applied to items on the list comprising addresses;
convert the standardized inquiry item to a N-bit object in a same manner that an item on the list was converted to produce a bit array;
determine bit positions based on the N-bit object in a same manner that bit positions were determined for producing the bit array;
determine that the inquiry item is on the list if the bits of the bit array equal a second value at the determined bit positions and determine that the inquiry item is not on the list if at least one bit of the bit array does not equal a second value at the determined bit position; and
output a result indicating whether the inquiry item is or is not on the list comprising addresses.

28. The computer according to claim 27, wherein the inquiry item comprises an address having a zip code, a primary address number, and a secondary address number and
  combining comprises concatenating the zip code, the primary address number, and the secondary address number.

29. The computer according to claim 27, wherein converting comprises computing a hash function for the standardized inquiry item.

30. The computer according to claim 29, wherein the hash function is the secure hashing algorithm, SHA-1.

31. The computer according to claim 27, wherein determining bit positions comprises:
  extracting multiple n-bit samples from the N-bit object;
  dividing each n-bit sample into a plurality of fields; and
  determining, for each n-bit sample, a bit position based on the n-bit sample by using a first field of the plurality of fields to specify an address of a byte and using a second field of the plurality of fields to specify the bit position within the byte.

32. The computer according to claim 27, wherein the processor is further configured to:
  add additional information not found in the inquiry item to at least one of the portions, in the same manner applied to items on the list comprising addresses, wherein the additional information corresponds to information from the inquiry item.

33. The computer according to claim 32, wherein the additional information is a ZIP+4 code, and the information from the inquiry item is one of a group comprising: a ZIP code and city identification information.

34. The computer according to claim 27, wherein the processor is further configured to:
  extract the portions that identify an address.

35. A system for representing a list comprising addresses using a bit array wherein each bit in the bit array is initialized to a first value, comprising:
  means for extracting portions of each address on the list;
  means for combining the portions to create a standardized item that is smaller than the address;
  means for converting each standardized item to a N-bit object;
  means for determining bit positions based on the N-bit object;
  means for setting bits of the bit array to a second value at the determined bit positions; and
  means for storing the bit array for use in determining whether an inquiry item is on the list.

36. The system according to claim 35, wherein an address on the list comprises a zip code, a primary address number, and a secondary address number and
  the means for combining comprises means for concatenating the zip code, the primary address number, and the secondary address number.

37. The system according to claim 35, wherein the means for converting comprises means for computing a hash function for each standardized item.

38. The method system according to claim 37, wherein the hash function is the secure hashing algorithm, SHA-1.

39. The system according to claim 35, wherein the means for determining comprises:
  means for extracting multiple n-bit samples from the N-bit object;
  means for dividing each n-bit sample into a plurality of fields; and
  means for determining, for each n-bit sample, a bit position based on the n-bit sample by using a first field of the plurality of fields to specify an address of a byte and using a second field of the plurality of fields to specify the bit position within the byte.

40. The system according to claim 35, further comprising:
  means for adding additional information not found in the address to at least one of the portions, wherein the additional information corresponds to information from the address.

41. The system according to claim 40, wherein the additional information is a ZIP+4 code, and the information from the address is one of a group comprising: a ZIP code and city identification information.

42. The system according to claim 35, wherein the means for extracting portions of each address on the list comprises:
  means for extracting the portions that identify a delivery location.

43. A system for determining whether an inquiry item is on a list comprising addresses, wherein the list is represented by a bit array having first and second values, the system comprising:
  means for extracting portions of the inquiry item in the same manner applied to items on the list comprising addresses;
  means for combining the portions to create a standardized inquiry item in the same manner applied to items on the list of-items comprising addresses;
  means for converting the standardized inquiry item to a N-bit object in a same manner that an item on the list was converted to produce the bit array;
  means for determining bit positions based on the N-bit object in a same manner that bit positions were determined for producing the bit array;
  means for determining that the inquiry item is on the list if the bits of the bit array equal a second value at the determined bit positions and determining that the inquiry item is not on the list if at least one bit of the bit array does not equal a second value at the determined bit positions; and
  means for outputting a result indicating whether the inquiry item is or is not on the list comprising addresses.

44. The system according to claim 43, wherein the inquiry item comprises an address having a zip code, a primary address number, and a secondary address number and
  the means for combining comprises means for concatenating the zip code, the primary address number, and the secondary address number.

45. The system according to claim 43, wherein the means for converting comprises means for computing a hash function for the standardized inquiry item.

46. The system according to claim 45, wherein the hash function is the secure hashing algorithm, SHA-1.

47. The method system according to claim 43, wherein the means for determining bit positions comprises:
  means for extracting multiple n-bit samples from the N-bit object;
  means for dividing each n-bit sample into a plurality of fields; and
  means for determining, for each n-bit sample, a bit position based on the n-bit sample by using a first field of the plurality of fields to specify an address of a byte and using a second field of the plurality of fields to specify the bit position within the byte.

48. The system according to claim 43, further comprising:
means for adding additional information not found in the inquiry item to at least one of the portions in the same manner applied to items on the list comprising addresses, wherein the additional information corresponds to information from the inquiry item.

49. The system according to claim 48, wherein the additional information is a ZIP+4 code, and the information from the inquiry item is one of a group comprising: a ZIP code and city identification information.

50. The system according to claim 43, wherein the means for extracting portions of the inquiry item comprises:
means for extracting the portions that identify an address.

* * * * *

UNITED STATES PATENT AND TRADEMARK OFFICE
CERTIFICATE OF CORRECTION

PATENT NO. : 7,302,582 B2 Page 1 of 1
APPLICATION NO. : 10/344990
DATED : November 27, 2007
INVENTOR(S) : Snapp et al.

It is certified that error appears in the above-identified patent and that said Letters Patent is hereby corrected as shown below:

In claim 10, column 9, line 14, "second" should read --secondary--.

In claim 38, column 11, line 60, "The method system" should read --The system--.

In claim 43, column 12, line 29, "of-items" should read --of items--.

In claim 47, column 12, line 57, "The method system" should read --The system--.

Signed and Sealed this

Eighteenth Day of November, 2008

JON W. DUDAS
*Director of the United States Patent and Trademark Office*